United States Patent [19]

Sauka et al.

[11] 4,283,092
[45] Aug. 11, 1981

[54] VEHICULAR BRAKING SYSTEM UTILIZING A HYDRODYNAMIC BRAKE AND FRICTION BRAKE

[75] Inventors: Klaus Sauka, Crailsheim, Fed. Rep. of Germany; Hortz Muschelknautz, deceased, late of Crailsheim, Fed. Rep. of Germany, by Ingeborg Muschelknautz, heiress

[73] Assignee: Voith Turbo GmbH & Co. KG, Fed. Rep. of Germany

[21] Appl. No.: 44,457

[22] Filed: Jun. 1, 1979

[30] Foreign Application Priority Data

Jun. 7, 1978 [DE] Fed. Rep. of Germany ....... 2824909
May 10, 1979 [DE] Fed. Rep. of Germany ....... 2918793

[51] Int. Cl.³ .............................................. B60T 8/02
[52] U.S. Cl. ................................ 303/3; 188/181 C; 188/181 T; 188/271; 188/290; 188/156

[58] Field of Search ................ 188/271, 156, 290–296, 188/181 T, 181 C; 303/3, 15–17, 108, DIG. 1, DIG. 2

[56] References Cited

U.S. PATENT DOCUMENTS 3,989,127  11/1976  Staudenmaier et al. ......... 188/181 C
4,095,680  6/1978  Vogelsang ......................... 303/3 X

FOREIGN PATENT DOCUMENTS 2120743 12/1972 Fed. Rep. of Germany ........... 188/271
2239008  2/1974 Fed. Rep. of Germany .

*Primary Examiner*—Douglas C. Butler
*Attorney, Agent, or Firm*—Ostrolenk, Faber, Gerb & Soffen

[57] ABSTRACT

A braking system utilizing a hydrodynamic brake has a control circuit that adjust the torque exerted by the hydrodynamic brake to adjust the deceleration of the axle on which the hydrodynamic brake is mounted toward a desired value of deceleration, which desired value may be zero.

12 Claims, 2 Drawing Figures

VEHICULAR BRAKING SYSTEM UTILIZING A HYDRODYNAMIC BRAKE AND FRICTION BRAKE

BACKGROUND OF THE INVENTION

The present invention relates to a braking system, intended primarily for use in highway vehicles, in which a friction brake is associated in the conventional manner with each wheel of the vehicle and a hydrodynamic brake in provided on one axle, generally the rear axle, of the vehicle.

The hydrodynamic brake and the friction brakes may be controlled by means of separate respective operating levers, or the hydrodynamic brake may be controlled jointly with the friction brakes by means of a single operating lever.

One common problem arises when the braking torque exerted on an axle exceeds a certain critical value, the axle locks and the vehicle skids, the driver often losing control of it in the process. It is therefore highly desirable to prevent such a condition, called "overbraking".

One well known manner of attacking this problem is to provide an automatic retaining device, for instance a hydropneumatic control valve, on the friction brakes of the axle on which the hydrodynamic brake is mounted. The retaining device reduces the braking torque exerted at any instant by the rear friction brakes, by an amount equal to the braking torque exerted by the hydrodynamic brake.

SUMMARY OF THE INVENTION

According to the present invention, one axle (assumed hereinafter to be the rear axle, although any axle might be chosen) is equipped with a hydrodynamic brake and may further be equipped with conventional friction brakes. Each wheel on the other axles is provided with a friction brake only. The deceleration of the rear axle is monitored by a control device whenever the hydrodynamic brake is operating, including both those changes instead which are due to a gradient in the road and those changes which are brought about by operation of any of the friction brakes of the vehicle. If the driver increases the force exerted by the friction brakes, the control device decreases the braking action of the hydrodynamic brake by the amount necessary to maintain the deceleration of the vehicle (or, more exactly, that of the rear axle) at a constant value. If the friction and the hydrodynamic brakes are jointly controlled, the friction brakes of the vehicle axle equipped with the hydrodynamic brake are actuated only after the hydrodynamic brake is producing the greatest braking torque possible at the speed of rotation in question; however, the friction brakes of the other axles are applied even when the braking torque exerted by the hydrodynamic brake is small. In this fashion, the braking force is distributed as uniformly as possible among the various axles. If the force exerted by the friction brakes alone provides a deceleration greater than that desired, then the control device completely shuts the hydrodynamic brake off. By this means, over-braking of the axle equipped with the hydrodynamic brake is made less likely than would be the case with a conventional brake system, and in this way the vehicle can be controlled better in critical traffic situations (for instance during emergency braking), since the braking forces are distributed optimally among all the wheels of the vehicle.

The control device of the invention entails no extra expense, since the known braking devices already have a control device which, however, is designed to keep not the deceleration but the braking torque constant at a set value, and since the automatic retention device is omitted from the braking system of the present invention.

Without the retention device, in the lowest speed range of the vehicle and particularly when the vehicle is to be brought to a stop, the friction brakes are no longer automatically applied to compensate for the fact that the hydrodynamic brake loses its braking force at low speed, and all the friction brakes must now be actuated by the driver. Any minor inconvenience this may represent, however, is far outweighed by the advantages of the present invention.

There is known (see for example, U.S. Pat. No. 3,917,356) a braking device having a control means that is intended to keep the acceleration of the axles or of the vehicle at a selected value, and including as well an rpm measuring device and a differentiating device connected thereto. Braking systems of this known type include no hydrodynamic brake, but only a plurality of identical hydraulically-actuatable friction brakes.

The system of the invention has additional advantages over conventional systems. Because the control means regulates the deceleration rather than the braking torque, the instantaneous value of the mass of the vehicle is automatically also taken into consideration, just as is done by load-dependent braking-force regulators; that is, the control means increases the hydrodynamic braking torque when the load of the vehicle increases, in order to keep the deceleration constant. With increasing weight of the vehicle, the traction of the wheels against the road is improved and thereby a greater braking moment can be transferred to the roadway without the wheels locking.

If over-braking should occur for any reason, for instance on ice, and the wheels start to skid, the control means notes this immediately and reduces the braking moment accordingly. The immediate operation of the control means is assured by the fact that the information responsive to which the control means acts, i.e. the deceleration of the vehicle, is obtained by differentiating the speed of rotation of the rear axle of the vehicle (or of the universal shaft driving it) and not, for instance, by an instrument that records changes in inertia.

It is necessary to protect the hydrodynamic brake from excessive mechanical strain. Conventional hydrodynamic vehicular braking systems measure the fluid pressure inside the hydrodynamic brake, which is at least approximately equal to the hydrodynamic braking torque (such a system is described in German Pat. No. 2 408 876), or the braking torque may be measured directly by means of a torque connection fastened to the stator (as, for instance, in German Unexamined Application for Pat. No. 2 239 008). With such systems, it is easy to limit the fluid pressure established in the housing of the hydrodynamic brake and the mechanical load exerted on its structural parts to a permissible amount. With the braking system of the invention, these customary methods cannot be used, since now, as already mentioned, the control means no longer monitors the braking torque but the deceleration of the braked vehicle axle. In order to protect the hydrodynamic brake, a maxium allowable pressure for the brake fluid is established, and means is included to prevent the pressure from exceeding that limit.

It is preferable to use, instead of conventional mechanical or hydraulic control means generally used in hydrodynamic brakes, an electronic control means, such as that taught in the aforementioned U.S. Pat. No. 3,917,356. In this case it is self-evident that in order to measure the deceleration an electrical measuring device is provided and in order to provide a reference signal representing the desired value an electrical reference signal generator is provided. As pressure switches, electric switches are preferred; furthermore it is preferable to control the amount of fluid in the hydrodynamic brake, to provide solenoid valves controlled by the control means. In this way the various data and operating commands can be processed easily and simply. Furthermore, the hysteresis which is unavoidable in known controllers can be prevented or at least substantially reduced.

Another advantage which is obtainable by the invention resides in the fact that, when desirable, a "zero deceleration" order can be given to the reference signal generator. In this way, the speed of the vehicle can, if desired, be maintained at a selected constant value. This is particularly advantageous when the vehicle is traveling down a long hill. It has been found in this connection that a constant speed can under certain circumstances (for instance in the case of a non-uniform gradient) be maintained only for a short time. It is therefore desirable to provide a separate control means for use when constant speed is desired.

The primary object of the present invention is to provide an improved braking system that will avert over-braking of the vehicle axle equipped with the hydrodynamic brake (generally the rear axle) more reliably, and yet no more expensively, than can be done conventionally.

It is a further object of the present invention to provide a brake system that will unlock the wheels of the vehicle if overbraking does occur.

It is another object to provide a braking system that will adjust the braking torque according to the vehicle's load.

It is still another object to provide a braking system that can be used to maintain the vehicle's speed constant at a selected value.

It is yet another object to provide a braking system that will achieve the above objects without subjecting the structural components of the hydrodynamic brake to excessive strain.

BRIEF DESCRIPTION OF THE FIGURES

These and further objects and advantages will become clear from the detailed description of the preferred embodiments, taken in conjunction with the accompanying figures, in which.

DETAILED DESCRIPTION OF THE INVENTION

Figure 1:
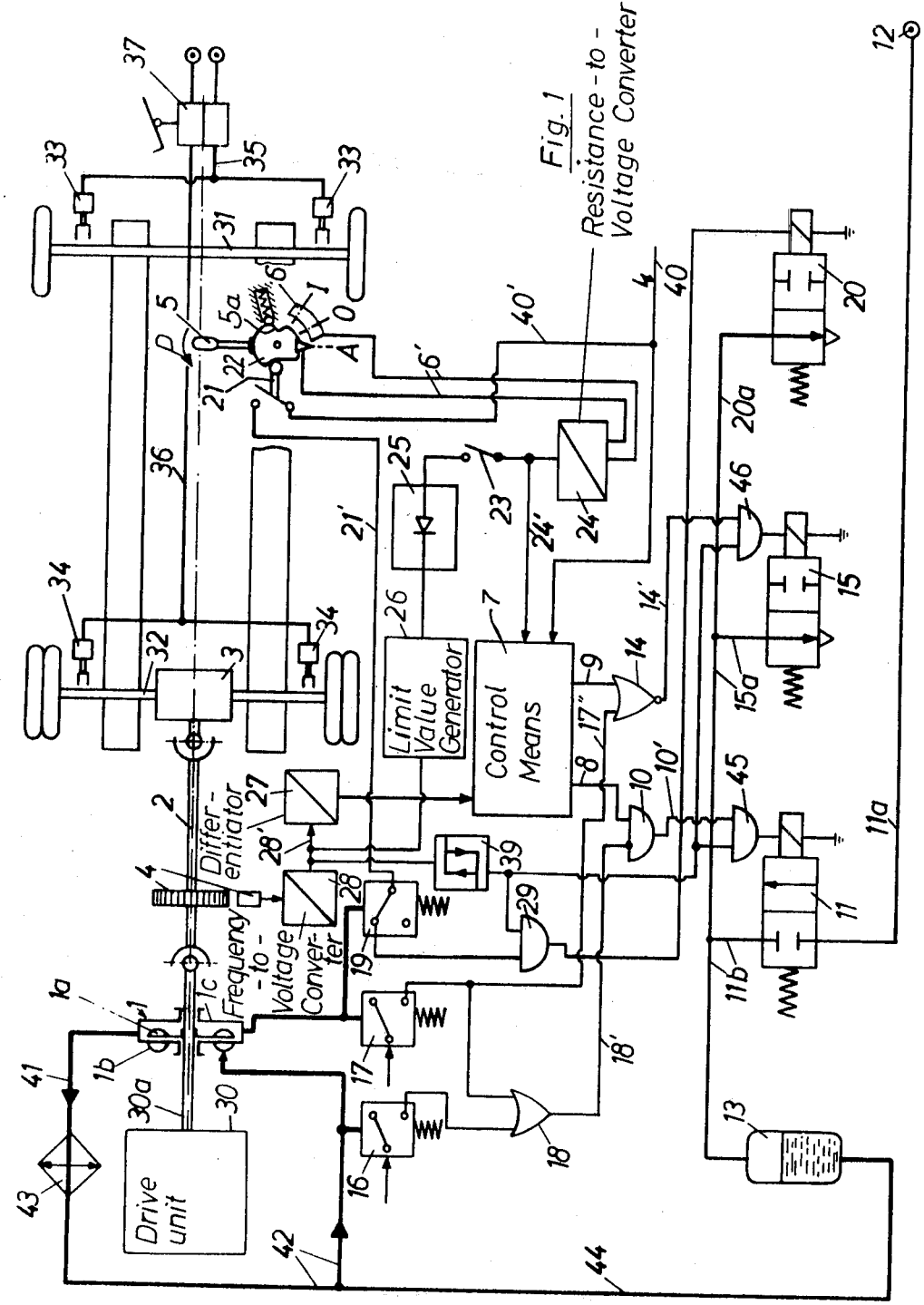
FIG. 1 shows the control diagram for one embodiment of a vehicular braking system according to the invention.

In FIG. 1, the front axle of a highway vehicle is shown at 31 and the rear axle at 32. There are also shown a drive unit with transmission 30 and drive shaft 30a, a hydrodynamic brake 1 arranged on the drive shaft 30a, a universal joint shaft 2, and a differential 3. The mechanical brake system includes two brake cylinders 33 on the front axle 31, two brake cylinders 34 on the rear axle 32, and a foot-pedal valve 37 which is connected with the brake cylinders via pressure-fluid conduits 35 and 36.

To regulate the hydrodynamic brake 1 an electronic control means 7 is provided. An electric speed measuring device 4 arranged on the universal shaft 2 is connected via a frequency voltage converter 28 and a line 28' to a differentiating unit 27, which is connected to the control means 7. The latter thus receives as actual value of the deceleration (also known as the "control value") an electric signal proportional to the deceleration of the universal shaft 2. By means of a slide resistor 6 which can be adjusted by a hand lever 5, an electric signal representing the desired value of the deceleration is generated; it is fed via a resistance-voltage converter 24 to the control means 7. In the drawing, the hand lever 5 is shown in position A (brake 1 disengaged). Upon the turning of the hand lever 5 in the direction indicated by the arrow P, it comes first of all into the position O, in which it is held by a detent 5a and in which "zero deceleration" is ordered, i.e. the speed of travel is to be maintained constant at the value it has at the moment the switch is moved to position O. From position O, the lever can be shifted continuously up into the position I, whereby various deceleration values other than zero are selected. Current is supplied to the control means via line 40.

The hydrodynamic brake 1 has a rotor impeller 1a and a housing 1c with a stator impeller 1b. The conduit system for the working fluid of the brake 1 comprises an outlet line 41, an inlet line 42, a cooler 43, a filling and emptying line 44, and a hydraulic accumulator 13. The air pressure in the accumulator 13 determines, in a known manner, the amount of fluid in, and thus the braking action of, the fluid brake 1. The air side of the hydraulic accumulator 13 is connected to a pressure source 12 via a line 11b/11a in which there is an electromagnetically actuable on-off valve 11, which is closed in its rest position. From line 11b, a discharge line 15a branches off to another electromagnetically actuable on-off valve 15, which is open in its rest position.

The control means 7 has two outputs, one output 8 for a signal to increase braking torque and an output 9 for a signal to reduce braking torque. Output 8 is connected to one input of an AND gate 10 whose output is connected via another AND gate 45, to the solenoid of valve 11. Output 9 is connected to one input of a NOR gate 14, the output of which is connected via and AND gate 46 to the solenoid of valve 15.

The control means 7 compares the control value (i.e. the measured actual value) with the reference value of the deceleration, and the appropriate signal "increase braking torque" or "decrease braking torque" appears on the output 8 or the output 9, respectively. If the actual torque of the fluid brake 1 is too low to obtain the preselected deceleration, a signal to increase torque will appear at the output 8, until the preselected deceleration of the vehicle is reached, when the signal disappears from output 8. If the actual value of the deceleration is higher than the desired value, then a signal appears at output 9. A signal at output 8 will, in the proper circumstances (described below), activate the solenoid to open valve 11, admitting more fluid into the fluid brake 1 and increasing the fluid braking torque. A signal at output 9, on the other hand, blocks NOR gate 14 from putting out a signal, so that the solenoid of valve 15 cannot operate and valve 15 must be in its rest position, open, thus draining fluid from the hydrodynamic brake 1, as long as output 9 carries a signal.

In order to monitor the pressure in the fluid brake 1, pressure switches 16 and 17 are provided. Pressure switch 16 monitors the pressure in the inlet line 42 of the brake 1, and pressure switch 17 that in the housing 1c. Their electric outputs are respectively connected to the inputs of an OR gate 18, the output of which is inverted and input into the second input of AND gate 10.

Pressure switch 16 generates a signal when the liquid pressure in the inlet line 42 reaches a certain value, at which the fluid brake 1 is full to capacity of operating liquid. The purpose of this signal is to prevent further increase of the pressure in the hydraulic accumulator 13 and unnecessary consumption of control energy.

Pressure switch 17 generates a signal when the maximum tolerable liquid pressure is reached in the braking housing 1c. In this case also, a further increase of the pressure in the hydraulic accumulator 13 is prevented by a signal from OR gate 18. Thus, if the pressure in either the fluid brake 1 itself or its inlet line 42 is excessive, the resulting signal from OR gate 18, inverted and input to AND gate 10, prevents the opening of valve 11, even when the control means 7 is generating a signal on output 8 to increase the fluid braking torque. This is necessary to avert the danger that the fluid brake 1 would produce an intolerably high braking moment or that parts of the brake housing 1c would be subjected to excessive stresses.

Additional protection against these dangers is provided by the connection of the output of pressure switch 17 to the second input of the NOR gate 14, the other input of which is the "decrease braking torque" signal of output 9 of control means 7. A signal from pressure switch 17 thus prevents the NOR gate 14 from producing an output signal, with the result that the solenoid of valve 15 cannot operate and the valve 15 opens to vent fluid from the hydrodynamic brake 1.

An additional assurance against too great an increase of the liquid pressure in the fluid brake 1 can also be provided. A third pressure switch 19, which is closed in its position of rest, is connected hydraulically to the brake housing 1c. The switch point of this pressure switch 19 is higher than that of pressure switch 17, so that the former only opens when a disturbance occurs which results in an intolerable increase of the liquid pressure in the brake housing 1c. The pressure switch 19 also has an electrical input, which is connected via a switch 21 arranged on the reference signal generator 5, 6 to the supply voltage (line 40). The output of the pressure switch 19, which is closed in its position of rest, is connected with one input of an AND gate 29, the output of which is connected to the solenoid of a third electromagnetically actuable on/off valve 20. This value is in a second vent line 20a connected to vent line 15a, and serves to drain the fluid brake 1 quickly, and thus lower the fluid braking torque quickly, when the hydrodynamic brake system is deactivated. When the lever 5 is moved to activate the braking system of the invention, switch 21 closed, and as long as switch 19 is not opened by excessive pressure in the fluid brake 1, a signal is input to AND gate 29 from switch 19. As long as this in the case, and the other input to AND gate 29 is in the proper state (which occurs in circumstances described below), the solenoid of valve 20 operates to hold valve 20 closed. When the pressure in the fluid brake 1 becomes intolerably high, or the braking system is deactivated by the movement of control lever 5 to position A, the signal from pressure switch 19 to AND gate 29 ceases, and the AND gate can no longer keep the solenoid of valve 20 in operation, with the result that the valve 20 is allowed to return to its (open) rest position, thus draining the fluid from the fluid brake system.

Thus, the arrangement of pressure switch 19, valve 20, etc., described above serves two functions. The "safety" pressure switch 19 protects the fluid brake 1 from overload in the event of a possible disturbance, for instance jamming of one of the valves 11 or 15 or failure of the control means 7. Also, upon disconnection of the fluid brake 1 a rapid decrease in the braking torque is assured. In this way a definite saving in fuel can be achieved, since the vehicle frequently is accelerated immediately after the deactivation of the fluid brake. If the brake did not empty itself sufficiently fast in this case, the drive unit 30 would have to work temporarily against the remaining braking moment, with consequent increase in the consumption of fuel.

It is frequently desirable for the fluid brake 1 to empty automatically when the vehicle is stationary so that the shaft packings are not under unnecessary pressure. For this purpose, the following measure is employed. A zero-voltage indicator 39 is connected as a limit-value transmitter to the line 28', which conducts a signal proportional to the speed of rotation of the universal shaft 2. The zero-voltage indicator sends a signal to the AND gates 29, 45 and 46 whenever the speed of rotation, and thus the speed of travel, are above a certain limiting value, for instance a vehicular speed of 5 km/hr. When the vehicle is traveling below this speed, provided that the brake 1 has been previously activated, zero-voltage indicator 39 puts out no signal. This blocks AND gates 29, 45 and 46 from producing a signal, and the solenoids of valves 11, 15 and 20 are deactivated, allowing the three valves to return to their rest positions, which are closed, open and open, respectively. The result is the rapid draining of fluid from the fluid brake 1. AND gates 45 and 46 prevent the control means 7 from actuating valves 11 and 15 when the vehicle is stationary.

During braking, valve 20 remains closed, and adjustment of the braking torque is effected exclusively by means of valves 11 and 15. Due to the presence of the so-called rapid-discharge valve 20, valve 15 can be of smaller dimensions, making it more suitable for the control processes.

The switching arrangement described also serves to disconnect the hydrodynamic brake 1 rapidly in the event that the rear axle 32 locks. If during normal braking the actual value of the deceleration is too great, this is counteracted, as already mentioned above, by the control means 7 by means of valve 15. However, if the wheels of the rear axle are locked, the locking is eliminated in the fastest possible manner by means of elements 39, 29, 45 and 46, which drain the fluid brake 1 rapidly, as explained above.

Since the hydrodynamic brake 1 normally transmits its braking torque to the road via the universal shaft 2, the differential 3, the rear axle 32 (frequently with additional step-down transmissions) and the wheels, these parts are correspondingly placed under a load during braking. These parts are designed to transmit the engine power. The braking power, however, often amounts to several times the engine power. It is therefore very desirable to limit the hydrodynamic braking as a function of the speed of travel. For this purpose, the line 24' between resistance-voltage converter 24 and control means 7 is connected via a switch 23, a diode circuit 25, and a limit-value generator 26, with the line 28' between converter 28 and differentiator 27. The limit-value generator 26 produces a limit voltage dependent on the voltage produced by the frequency-voltage converter 28 (which is a measure of the speed of rotation of the universal shaft 2 and thus of the speed of travel). The limit voltage goes from the limit value generator 26 to the diode circuit 25. As long as switch 23 is open, the reference signal determined by means of the sliding resistor 6 is fed unchanged into the control means 7. However, if switch 23 is closed, then the diode circuit 25 ensures that the reference voltage generated by the converter 24 does not exceed the limit voltage.

With the circuit described above one limits the reference signal voltage in a way dependent on the instantaneous speed of the vehicle. In this way, a limitation of the braking power is obtained. The arrangement described will be sufficient for many practical purposes. It has the advantage that it can be produced simply.

If the accuracy of the arrangement described above is not sufficient, it is necessary to feed to the limit value generator 26 a signal depending on the actual torque of the fluid brake 1. This signal could have the form of a voltage produced by a torque measurement shaft or by a pressure measurement capsule that measures the pressure of the operating liquid in the housing 1c of the brake 1, which pressure is approximately proportional to the braking torque.

In the embodiment shown by way of example, the control means 7 controls the setting devices of the fluid brake 1, and therefore valves 11 and 15, by means of digital signals. As a result, the air pressure in the lines 11b and 15a changes stepwise. Nevertheless, the braking action of the brake 1 is changed substantially continuously since the hydraulic accumulator 13 acts as a dampening element. The advantage of this method of control is that valves 11 and 15 can be simple on-off valves.

The case is different when the amount of fluid in the fluid brake 1 is to be controlled by a control valve which is arranged in a line for the working fluid, without employing a hydraulic accumulator. In this case it is advisable to use as a control valve a valve whose movable valve member can assume any desired number of intermediate positions, for example, a so-called servovalve or a proportional valve. The control means must in this case control the control valve by means of an analog electrical signal, i.e. a continuously variable electric signal. This method can, of course, also be used or controlling a fluid brake pneumatically through a hydraulic accumulator.

Figure 2:
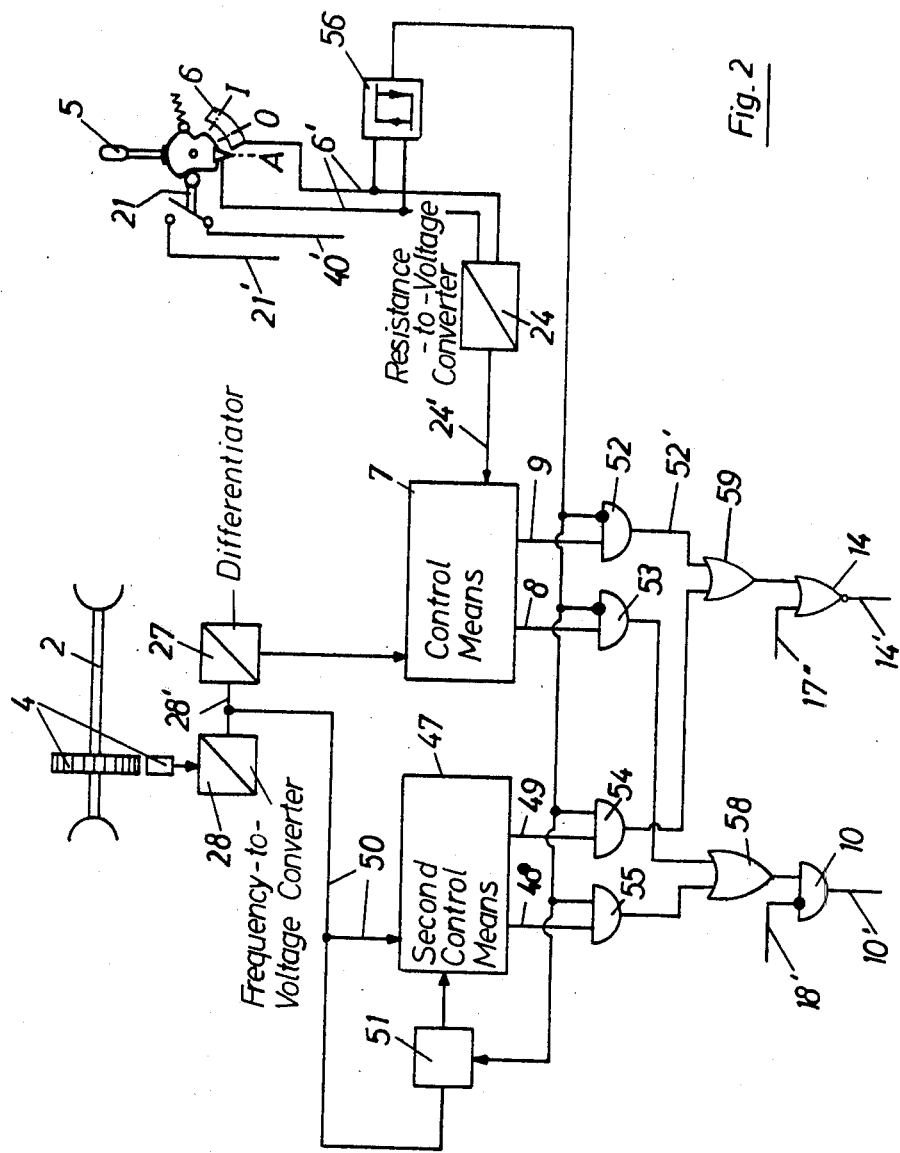
FIG. 2 shows a modification of a portion of the control diagram of FIG. 1.

A portion of another embodiment of the invention is shown in FIG. 2. In this figure there are only shown those parts of the control means of the braking system which are necessary for an understanding of this embodiment.

An additional electronic control means 47 is provided whose control value (actual value of the deceleration) input is connected to the line 28' and therefore with the output of the frequency-voltage converter 28 which forms part of the electric speed measuring device 4. Thus the speed of rotation of the universal shaft 2, and thus the speed of travel, is introduced into the control means 47 as the control value.

In order for it not to be necessary, for instance, to provide an additional actual-value measuring device for the additional control means 47, the reference signal which is introduced into the second control means 47 is formed in the following fashion by means of the existing reference signal generator 5, 6. A so-called sample-and-hold storage 51 is provided. The instantaneous speed is continuously fed to the second control means 47 from the frequency-to-voltage converter 28. Furthermore, a zero-voltage indicator 56 is connected to the lines 6' connecting the adjustable sliding resistor 6 to the converter 24. The output of the indicator 56 is connected to a second input of the sample-and-hold storage 51. When the resistance set on the sliding resistor 6 reaches a certain low value, indicated on the scale by the position 0, the zero-voltage indicator 56 generates a signal which is equivalent to the command "zero deceleration". In other words, by this signal the command is given that the speed of travel is to be maintained constant. The signal actuates the sample-and-hold storage 51, which now stores the speed of travel present at the time of the appearance of the command "zero deceleration". This stored speed value is output by the sample-and-hold storage 51, as long as the command "zero deceleration" is maintained, as a reference signal to the second control means 47.

The control means 7 shown in FIG. 2, which serves to maintain the deceleration constant, has, as in the embodiment of FIG. 1, an output 8 for the signal "increase braking torque" and an output 9 for the signal "reduce braking torque". Similarly, the second control means 47 which holds the speed of travel constant has an output 48 for the signal "increase braking torque" and an output 49 for the signal "reduce braking torque". As in FIG. 1, the output of AND gate 10 is connected via the line 10' with AND gate 45, not shown in FIG. 2, and the output of NOR gate 14 is connected via the line 14' with AND gate 46, not shown in FIG. 2.

In this embodiment, however, the outputs 8 and 9 of the control means 7 in FIG. 2 are no longer connected directly with the logic elements 10 and 14. Rather, a switching device comprising the logic elements 52–55, 58 and 59, as long as "zero deceleration" is ordered, makes the logic elements 10 and 14 responsive to the outputs 48 and 49 of the second control means 47 and unresponsive to the output of the first control means 7. Each of outputs 8, 9 and 48, 49 is connected to one input of an AND gate 53, 52, 55 or 54, respectively. The other input of each of gates 52–55 is connected to the output of the zero-voltage indicator 56, the signal from which is inverted, however, before entering AND gates 52 and 53. The outputs of AND gates 53 and 55 are connected to the input of OR gate 58, the output of which goes to one input of AND gate 10, corresponding to the direct connection of output 8 alone to AND gate 10 in the embodiment of FIG. 1. Similarly, the output of AND gates 52 and 54 are connected to the two inputs of OR gate 59, the output of which is connected to one input of AND gate 14, corresponding to the direct connection of output 9 to the AND gate 14 in the embodiment of FIG. 1.

Therefore as long as a deceleration greater than zero is ordered by the reference signal generator 5, 6 and no signal is, accordingly, being output by zero-voltage indicator 50, signals appearing at output 8 or 9 will activate AND gates 52 or 53, respectively, which will provide a signal, via the OR gate 58 or 59, to the logic element 10 or 14, respectively. In this case, the braking device acts precisely in the same ways as in FIG. 1, i.e. the fluid brake 1 is automatically controlled in such a manner that a selected value of deceleration is maintained. On the other hand, upon the command "zero deceleration", the zero-voltage indicator 56 produces a signal which, inverted, deactivates AND gates 52 and 53, so that signals from the first control means 7 are blocked, and permits AND gates 54 and 55 to be activated, respectively, by a signal from output 49 or 48 of the second control means 47. Signals from the second control means 47 will now be transmitted by AND gate 54 or 55 and OR gate 59 or 58 to element 14 or 10, to control the hydrodynamic brake pressure. Accordingly the amount of fluid in the hydrodynamic brake 1 (FIG. 1) is now controlled so that the speed of the vehicle is maintained constant. If the reference signal generator 5, 6 is returned to a higher-resistance setting, above 0, the system resumes maintaining a constant deceleration rather than a constant speed.

The preferred embodiments described above may be varied in a number of ways. For example, means can be included in the braking system of the invention to reduce the fluid pressure if the temperature in the fluid brake 1 exceeds a certain level. Particularly, a temperature switch means can be provided for reducing the amount of fluid in the hydrodynamic brake when the temperature inside the housing of the brake exceeds a given temperature.

Although the invention has been described with reference to two preferred embodiments, many variations and modifications thereof will now be apparent to one skilled in the art, and it is preferred that the scope of the invention be limited not by the details of the embodiments described above, but only by the terms of the appended claims.

What is claimed is:

1. A braking system for use in a vehicle in which a friction brake is associated with each wheel of the vehicle and a hydrodynamic brake is associated with an axle of the vehicle, said hydrodynamic brake applying a braking torque to said axle, the magnitude of said braking torque and therefore the magnitude of the deceleration of said axle varying as a function of the amount of fluid in said brake, said braking system comprising:
   reference signal generating means for generating a first signal representative of a desired magnitude of said deceleration of said axle;
   deceleration measuring means for generating a second signal representative of the actual magnitude of said deceleration of said axle, said deceleration measuring means comprising speed sensing means for generating a speed signal representative of the speed of said axle, and differentiating means for differentiating said speed signal so as to generate said second signal;
   control means responsive to said first and second signals for varying said amount of fluid in said hydrodynamic brake in such a manner that said actual magnitude of said deceleration of said axle is adjusted towards said desired magnitude of said deceleration; and
   a first pressure switch means for monitoring the fluid pressure in said hydrodynamic brake and for preventing any rise therein once a given pressure in said hydrodynamic brake is reached.

2. The braking system of claim 1, wherein said hydrodynamic brake further comprises a housing and a fluid inlet line; and wherein said first pressure switch means monitors the fluid pressure in said housing; and further comprising a second pressure switch means for monitoring the fluid pressure inside said inlet line and for preventing any rise in said pressure in said line once said given pressure is reached therein.

3. The braking system of claim 2, wherein said first pressure switch means, once said given pressure is reached in said housing, reduces the amount of fluid in said hydrodynamic brake.

4. The braking system of claim 3, further comprising rapid-discharge means for removing fluid from inside said hydrodynamic brake rapidly relative to the rate at which said first pressure switch means can remove fluid from said hydrodynamic brake, when said hydrodynamic brake is deactivated.

5. The braking system of claim 4, further comprising a third pressure switch means for monitoring the fluid pressure inside said housing of said hydrodynamic brake and for actuating said rapid-discharge means when said fluid pressure exceeds a second given pressure higher than said first given pressure.

6. The braking system of claims 1, 2 or 3, further comprising means for limiting said first signal so that said first signal cannot be representative of a deceleration greater in magnitude than a given deceleration, said given deceleration being a function of the frequency of rotation of said axle.

7. The braking system of claim 1, further comprising a switch device for deactivating said hydrodynamic brake when the frequency of rotation of said axle falls below a given value.

8. The braking system of claim 1, further comprising temperature switch means for reducing the amount of fluid in said hydrodynamic brake when the temperature inside said housing of said hydrodynamic brake exceeds a given temperature.

9. The braking system of claim 1, wherein said first control means further comprises:
   brake control means for controlling the amount of fluid in said hydrodynamic brake; and
   electronic control means for controlling said brake control means responsive to said first and second signals.

10. The braking system of claim 1, wherein said reference signal generating means is actuable by means of a lever that can assume any of a continuum of positions, the magnitude of said first signal being determined by the position of said lever, and said position being chosen to correspond to said desired magnitude of deceleration; one of said positions corresponding to a desired deceleration of magnitude zero, and said lever being retainable in said one position by means of a detent.

11. The braking system of claim 10, further comprising a second control means responsive to the speed of rotation of said axle for varying said amount of fluid in said hydrodynamic brake in such a manner that said speed of rotation of said axle is maintained substantially constant, said second control means being actuated when said lever is put into said one position and being deactivated when said lever is in any other position, and said electronic control means being deactuated when said lever is in said one position and being actuated when both said lever is in any other position and said hydrodynamic brake is actuated.

12. The braking system of claim 11, further comprising storage means for storing a signal representative of said speed of rotation of said axle as of the instant said lever is put into said one position, said second control means being responsive to said stored signal and to a third signal representative of the actual magnitude of said speed of rotation of said axle to vary said amount of said fluid in said hydrodynamic brake in such a manner that said actual magnitude of said speed of rotation of said axle is adjusted towards said speed represented by said stored signal, whereby said actual speed is maintained substantially constant.

* * * * *